A. DORN.
Toy.
No. 224,585.  Patented Feb. 17, 1880.
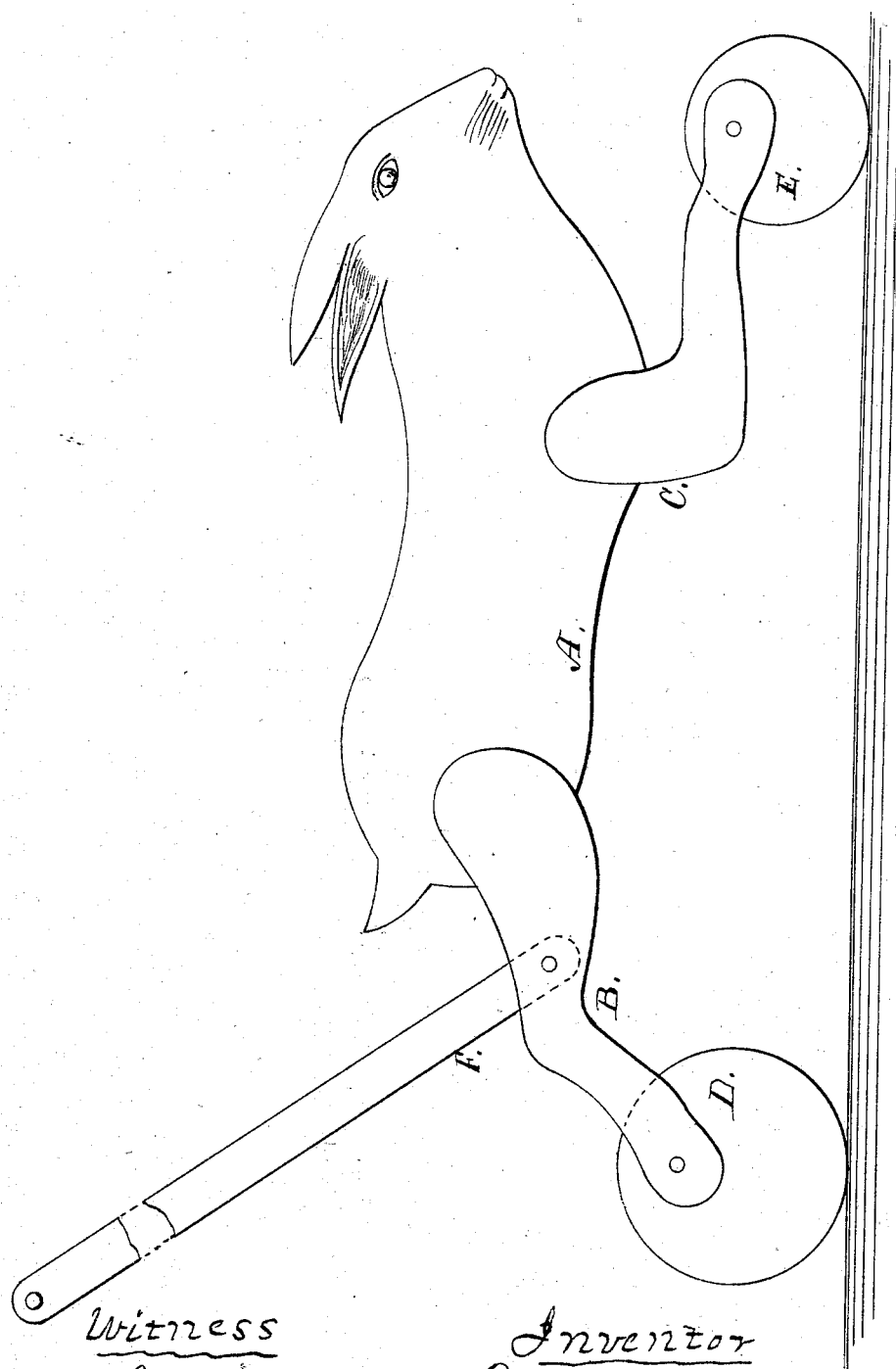
Witness
Geo. B. Adams.
J. J. Ghegan
Inventor
August Dorn
By Samuel Harris Atty

UNITED STATES PATENT OFFICE.

AUGUST DORN, OF NEWARK, NEW JERSEY, ASSIGNOR TO HIMSELF, JOHN P. HENNION, AND HENRY B. DOREMUS, OF SAME PLACE.

TOY.

SPECIFICATION forming part of Letters Patent No. 224,585, dated February 17, 1880.

Application filed September 20, 1879.

*To all whom it may concern:*

Be it known that I, AUGUST DORN, of Newark, in the county of Essex and State of New Jersey, have invented a new and useful Improvement in Toys, of which the following is a specification.

My invention relates to trundling toys, and is applied to imitation animals to give them, when moved forward, the appearance of animals in the act of running.

The drawing is a side elevation, showing a rabbit as in motion.

The body A of the rabbit is cut from a piece of thin board, or may be made of any other material, and has secured to it fore and hind legs, B C. The legs are in pairs, front and back, attached to the sides of the body, leaving a space at the lower end between them for the wheels D E. The legs, however, may be variously attached, and two wheels in front and two in the rear may be used in place of the one. These wheels are hung to the legs off from the center, making eccentric-wheels, and the effect, when used, is to raise and lower the front and rear of the body of the animal, giving it a galloping motion, like an animal running. These wheels are usually made with one smaller than the other, to provide for the motion of different animals when running. In some the front part of the animal, in galloping, is thrown up, in which case the large wheels are hung to the front legs. In some others, as in the rabbit, the hind part is thrown up, and then the large wheels will be hung to the hind legs.

To the hind legs, or the rear of the animal, is jointed a shaft, F, to be used for trundling it, usually forward of the operator; but, instead of the shaft and the wheels fitted to run on a surface, the wheels may have a grooved face and be made to move on a fixed cord or wire backward and forward.

The invention is in the eccentric-wheels attached to the feet of animals; and the invention may be applied to horses made to move in a circle connected with a shaft on which a boy may ride.

The fore and hind wheels may be of the same or of different size, according to the peculiar effect to be produced.

What I claim as my invention, and desire to secure by Letters Patent, is—

The imitation animal having attached directly to the front and hind feet the wheels D E, hung eccentrically, and having the propelling-shaft F jointed to the rear portion of the animal, substantially as and for the purpose specified.

AUGUST DORN.

Witnesses:
HORACE HARRIS,
JOHN P. HENNION.